United States Patent
Scarth et al.

(10) Patent No.: US 7,072,561 B2
(45) Date of Patent: *Jul. 4, 2006

(54) METHOD AND APPARATUS FOR OPERATING VARIABLE OPTICAL ATTENUATOR BY MODULATING THE ATTENUATION THEREOF

(75) Inventors: Gordon Bruce Scarth, Ottawa (CA); Robert Michael Bierman, Ottawa (CA); Steve Joseph Grabner, Ottawa (CA)

(73) Assignee: Tropic Networks Inc., Kanata (CA)

( * ) Notice: Subject to any disclaimer, the term of this patent is extended or adjusted under 35 U.S.C. 154(b) by 306 days.

This patent is subject to a terminal disclaimer.

(21) Appl. No.: 10/618,604

(22) Filed: Jul. 15, 2003

(65) Prior Publication Data
US 2005/0019032 A1 Jan. 27, 2005

Related U.S. Application Data
(60) Provisional application No. 60/441,480, filed on Jan. 22, 2003.

(51) Int. Cl.
*G02B 6/00* (2006.01)

(52) U.S. Cl. ........................................ 385/140; 398/38

(58) Field of Classification Search .................... None
See application file for complete search history.

(56) References Cited

U.S. PATENT DOCUMENTS

| | | | |
|---|---|---|---|
| 6,600,594 B1 * | 7/2003 | Ko et al. .................... 359/337 |
| 2004/0109662 A1 * | 6/2004 | Scarth et al. ............... 385/140 |
| 2004/0165857 A1 * | 8/2004 | Xiao et al. ................. 385/140 |
| 2004/0197105 A1 * | 10/2004 | Khatana et al. ............. 398/173 |
| 2005/0025409 A1 * | 2/2005 | Welch et al. ................. 385/14 |

* cited by examiner

*Primary Examiner*—Sung Pak
(74) *Attorney, Agent, or Firm*—Victoria Donnelly

(57) ABSTRACT

A method and apparatus are disclosed for operating an eVOA by modulating its attenuation. If an optical signal power is below a loss of signal (LOS) power threshold the eVOA attenuation is set to a maximum attenuation and then, periodically and quickly decreased and increased in steps while checking for the presence of optical signals above the LOS power threshold. The method is also used for operating a multiplicity of eVOAs while minimizing the risk of damage to optical network equipment.

14 Claims, 10 Drawing Sheets

METHOD AND APPARATUS FOR OPERATING VARIABLE OPTICAL ATTENUATOR BY MODULATING THE ATTENUATION THEREOF

RELATED APPLICATIONS

This invention claims benefit from U.S. Provisional Patent Application Ser. No. 60/441,480 to Scarth, G. B., et al, entitled "Operating eVOA By Modulating Its Attenuation", and filed on 22 Jan. 2003.

This invention is also related to a U.S. patent application to Scarth, G. B., et al, entitled "Method and system for Operating a Plurality of Electronic Variable Optical Attenuators (eVOAs)", and filed concurrently herewith.

FIELD OF THE INVENTION

This invention relates generally to optical telecommunications networks and, in particular, to a method and apparatus for operating variable optical attenuator by modulating the attenuation thereof.

BACKGROUND OF THE INVENTION

In modern wavelength division multiplexing (WDM) networks, a loss-of-signal (LOS) condition causes signal power spikes that result in degradation in signal-to-noise ratio (SNR), increase in bit error rate (BER) and damage of downstream optical components. To compensate for unexpected power spikes of optical signals propagating in a WDM network, an electrically controlled variable optical attenuator (eVOA) (coupled with power monitoring and microcontroller apparatus) is typically inserted in the path of an incoming signal for each wavelength. The attenuator's setting is usually adjusted to a pre-determined fixed value which may or may not be sufficient to reduce and/or eliminate the unexpected signal power spikes.

A typical prior art eVOA apparatus includes an eVOA followed by an optical tap coupler for detecting the power of the optical signal at an output of the eVOA. The eVOA and the optical tap coupler are connected to a microcontroller. The microcontroller uses feedback from the optical tap coupler to control the eVOA attenuation to achieve a constant output optical power. In this architecture, a loss-of-signal (LOS) condition is declared when the signal measured at the output of the optical tap coupler drops below a loss-of-signal (LOS) power threshold.

Prior art offers numerous eVOA control mechanisms for handling a loss-of-signal (LOS) condition, wherein the eVOA attenuation is held at a fixed attenuation when a LOS condition is detected. Both U.S. Pat. No. 6,207,949 entitled, "Method and apparatus for stabilizing attenuators in optical networks" to Jackel, J., issued on Mar. 27, 2001, and U.S. Pat. No. 6,304,347 entitled, "Optical power management in an optical network" to Beine, T., et al, issued on Oct. 16, 2001) teach that the eVOA attenuation has to be kept at a constant attenuation that is less than the maximum attenuation of the eVOA. This leads to an exposure to potential disruption or damage of downstream optical components in the event of a sudden power spike in the WDM network, when said constant less than maximum attenuation is not sufficient to attenuate the power spike.

FIG. 1 shows a diagram 100 illustrating an operation and a control problem of a prior art eVOA apparatus when an eVOA attenuation is kept at fixed non-maximum attenuation during a LOS condition. Referring to FIG. 1, graphs (a), (b), and (c) are for an input power versus time, an output power versus time and eVOA attenuation versus time, respectively. In graph (a), at time t1, the input power 10 is removed and then reapplied after a specified time period t2, where the input optical power 115 is much higher. Between times t1 and t2 the input power 112 is zero. This may correspond, e.g., to the cleaning of a dirty patch cable, which is causing unwanted attenuation. In graph (c), before time t1, the eVOA attenuation is set at non-maximum attenuation 153. When the input power 110 in graph (a) is removed (that is at time t1), the eVOA control circuit maintains the eVOA attenuation at non-maximum attenuation 157 between times t1 and t2 and at attenuation 190 between times t2 and t3. The eVOA minimum attenuation (MinAtt) 155 and maximum attenuation (MaxAtt) 175 are shown in graph (c). Referring now to graph (b), before time t1, the output power 163 is a valid optical signal power (that is output signal power above the LOS power threshold). Between times t1 and t2, the output power 167 is dropped below the LOS power threshold 165. Then, at time t2, when the patch cord is reinserted, the output power spike 130 surges significantly above the previous output power 163, as shown in graph (b). This output power spike 130 in graph (b) lasts until the microcontroller detects the presence of optical power and attenuates the eVOA so as to reach the steady state output power 160.

FIG. 2 shows a diagram 200 illustrating limitations of the prior art apparatus that prevent holding the eVOA attenuation at its maximum attenuation. Referring to FIG. 2, graphs (a), (b), and (c) are for an input power versus time, an output power versus time and eVOA attenuation versus time respectively. In graph (a), at time t1, the optical input power 210 is removed and then restored after a specified time period t2, where the input optical power 215 is much higher. Between times t1 and t2 the input power 212 is zero. In graph (c), before time t1, the eVOA attenuation 290 is set at the non-maximum attenuation 295. When the input power 210 in graph (a) is removed (that is at time t1), the eVOA control circuit maintains the eVOA attenuation 290 at the maximum attenuation (MaxAtt) 275 between times t1, t2, and t3. The eVOA minimum attenuation (MinAtt) 255 and maximum attenuation (MaxAtt) 275 are shown in graph (c). Referring now to graph (b), before time t1, the output power 230 is a valid optical signal power (that is output signal power above the LOS power threshold). Between times t1 and t2, the output power 235 is below the LOS power threshold 265, while the eVOA attenuation 290 is set to the maximum attenuation (MaxAtt) 275 in graph (c). Between times t2 and t3, the output power 240 is also below the LOS power threshold 265 and thus, the microcontroller never determines if there is sufficient optical power at the input to the eVOA.

Prior art U.S. Pat. No. 6,304,347 also teaches an apparatus that has an eVOA coupled to two optical tap couplers that are connected to a microcontroller. One optical tap coupler leads the eVOA for detecting the power of the optical signal at an input to the eVOA and another optical tap coupler follows the eVOA for detecting the power of the optical signal at an output of the eVOA. This apparatus allows the microcontroller to monitor the optical signal power at the input to the eVOA and at the output of the eVOA. If a LOS condition is declared when the signal measured at the input to the eVOA, the optical tap coupler drops below a LOS power threshold. This overcomes the problems surrounding the prior art apparatus described above with an optical tap coupler following the eVOA. The eVOA may be kept at a maximum attenuation without risk of failing to detect the presence of the optical signal power, but at the expense of having an additional optical tap and monitoring the signal power at both input and output of the eVOA.

From a cost perspective it is desirable to use the eVOA apparatus with only one optical tap coupler that follows the eVOA to save the cost of another optical tap coupler that is before the eVOA. Having only one optical tap coupler that follows an eVOA also saves physical space and electrical power on the line card where the circuitry is housed.

Unfortunately, none of the existing prior art apparatus provides an effective and reliable operation of eVOA, while minimizing the number of optical components being used.

Accordingly, there is a need for the development of improved methods and apparatus for power control in optical control systems and WDM networks, which would reduce and/or avoid the shortcomings and limitations of the prior art.

SUMMARY OF THE INVENTION

It is an object of the present invention to provide a method and apparatus for operating an eVOA by modulating its attenuation so as to provide reliable protection of optical components against power spikes while minimizing the number of optical components utilized by the eVOA apparatus. It is another object of the invention to provide operation and control of multiple eVOAs by one microcontroller, wherein each eVOA is being controlled by modulating its attenuation.

The invention, therefore, according to one aspect provides a method for operating an electronically controlled variable optical attenuator (eVOA) inserted in an optical path of an optical signal propagating in an optical network, the method comprising the steps of monitoring an optical signal power at an output of the eVOA; if the optical signal power is below a loss of signal (LOS) power threshold, modulating the attenuation of the eVOA, the modulating comprising decreasing and increasing the eVOA attenuation in steps until the optical signal power is detected above the LOS power threshold or a maximum eVOA attenuation is reached. The step of monitoring comprises a step of setting the attenuation of the eVOA to a maximum attenuation (MaxAtt) if the measured optical signal power is below the LOS power threshold and a step of operating the eVOA so as to maintain said optical signal power if the measured optical signal power is above the LOS power threshold. The step of monitoring the eVOA attenuation comprises a step of storing said eVOA attenuation.

The step of modulating the eVOA attenuation by decreasing and increasing the attenuation in steps comprises a step of determining a maximum number of steps "$S_1$" for decreasing the attenuation, a maximum number of steps "$S_2$" for increasing the attenuation, an attenuation value per step "$A_s$", and a predefined protection attenuation (PPA). The step of modulating the eVOA attenuation in steps comprises a step of stepping down and decreasing the attenuation by $A_s$, wherein $\{MaxAtt-PPA\} \leq S_1 \cdot A_s$, and a step of stepping up and increasing the attenuation by $A_s$, wherein $\{S_2 \cdot A_s + PPA\} \leq MaxAtt$. The step of decreasing and increasing the eVOA attenuation in steps comprises a step of checking for a valid optical measured power at the output of said eVOA, the valid optical measured power being a signal measured power above the LOS power threshold.

In accordance with a first embodiment of this invention, the apparatus for operating an electronically controlled variable optical attenuator (eVOA) inserted in an optical path of an optical signal propagating in an optical network comprising a microcontroller for monitoring an optical signal power at an output of the eVOA and modulating the attenuation of the eVOA if the optical signal power is below a loss of signal (LOS) power threshold, the modulating being performed as decreasing and increasing of the eVOA attenuation in steps until the optical signal power is detected above the LOS power threshold or a maximum eVOA attenuation is reached.

Another aspect of this invention provides a method of operating a plurality of eVOAs inserted in optical paths of optical signals propagating in an optical network, comprising the steps of:
(a) selecting an eVOA from the plurality of eVOAs;
(b) operating the selected eVOA according to the method described above for the first embodiment of this invention within a time period allocated for the selected eVOA;
(c) repeating the steps (a) to (b) until all eVOAs from the plurality of eVOAs have been selected; and (d) repeating the steps (a) to (c) as required.

The step of monitoring a plurality of eVOAs attenuations comprises a step of continuously cycling said eVOAs in a specified time period "T", wherein "T" is a sum of all time periods $\{t_i$ and $i=1, n\}$, "n" is the number of eVOAs, and n>1, and $t_i$ is the time for actively controlling each eVOA. Further, for equal allocated time period per eVOA, wherein $t_1=t_2=t_i=t_n=\tau$, $\tau=T/n$, and $\tau$ is the time for actively controlling each eVOA. The step of cycling a plurality of eVOAs comprises a step of taking a finite time "$T_s$" for each step, and $$\tau = S_1 \cdot T_s < \frac{T}{n},$$

wherein "$T_s$" being the expected optical control system power transient time, and $S_1$ is the maximum number of steps for decreasing the eVOA attenuation. Also, the step of cycling a plurality of eVOAs comprises a step of taking a finite time "$T_s$" for each step, and $$\tau = S_2 \cdot T_s < \frac{T}{n},$$

wherein $S_2$ is the maximum number of steps for increasing the eVOA attenuation.

In accordance with a second embodiment of this invention, the apparatus for operating a plurality of eVOAs in an optical network comprises a microcontroller having a means for selecting an eVOA from the plurality of eVOAs; and a means for operating the selected eVOA according to the method for the first embodiment of this invention within a time period allocated for the selected eVOA.

The embodiments of the invention provide a method for modulating the eVOA attenuation by stepping down and decreasing the attenuation or stepping up and increasing the attenuation until a valid optical measured power at the output of said eVOA is detected, wherein the valid optical measured power being a signal measured power above the LOS power threshold.

The embodiments of the invention provide improved method and apparatus for operating an eVOA by modulating its attenuation. Additionally, if multiple eVOAs to be use, the method also allows a microcontroller to operate a multiplicity of eVOAs while minimizing the risk of damage to the WDM network components that would overcome the shortcomings and limitations of the prior art.

BRIEF DESCRIPTION OF THE DRAWINGS

The invention is better understood from the following description of a preferred embodiment together with reference to the accompanying drawing, in which.

DESCRIPTION OF THE PREFERRED EMBODIMENTS

Figure 1:
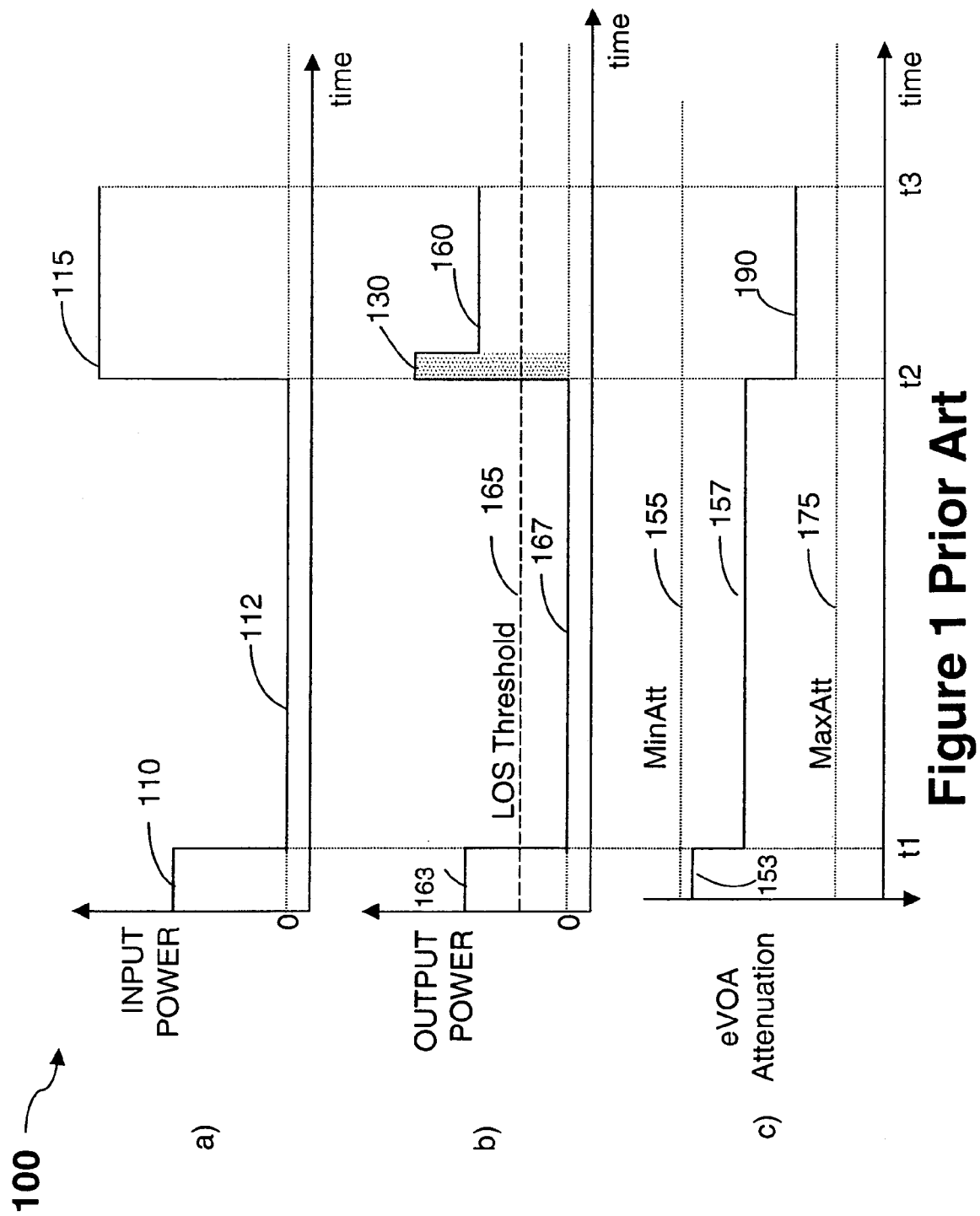
FIG. 1 is a diagram illustrating a dependence of input power, output power and eVOA attenuation versus time for a prior art eVOA apparatus when the eVOA attenuation is kept at a non-maximum level.
Figure 2:
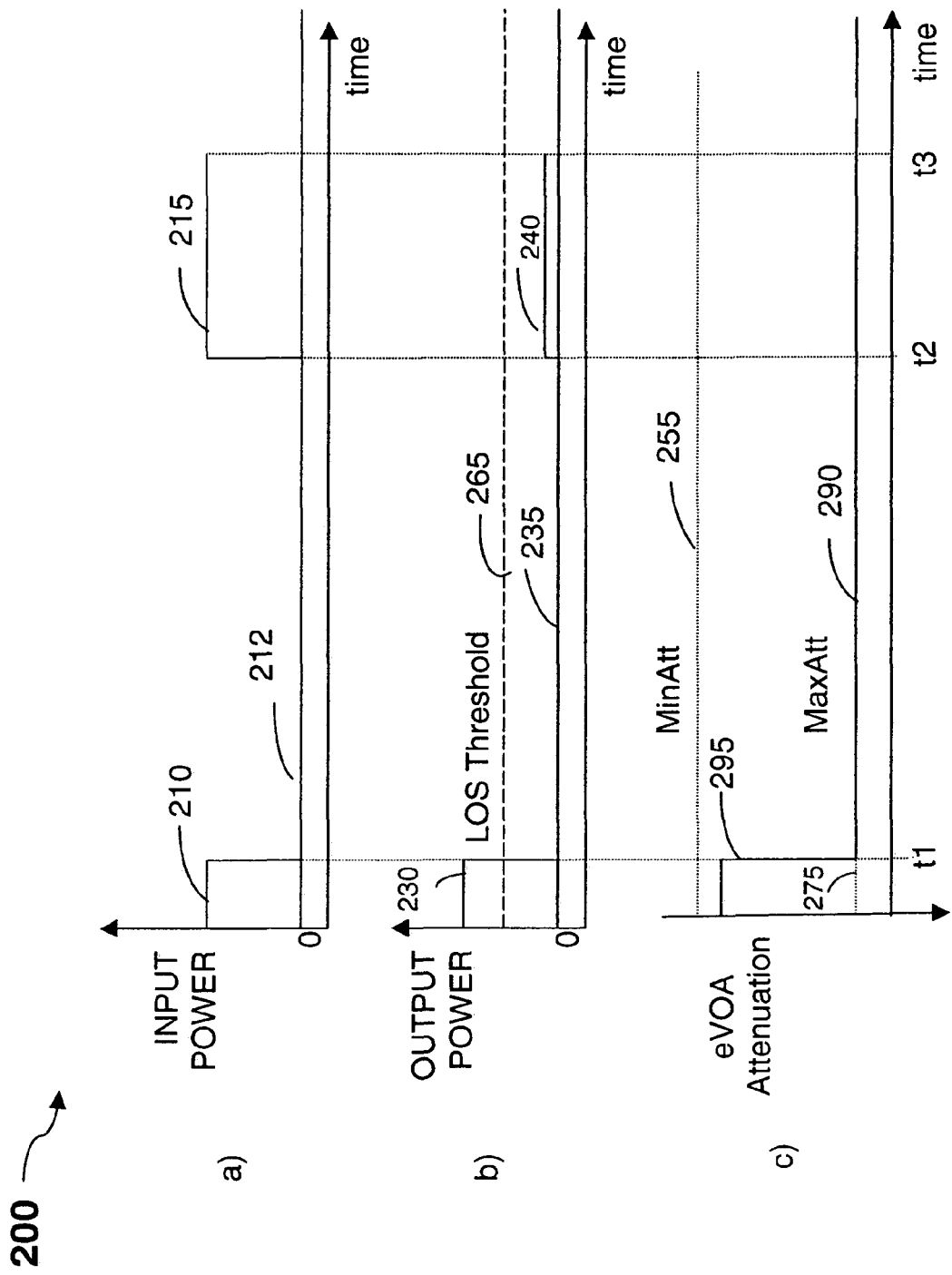
FIG. 2 is a diagram illustrating a dependence of input power, output power and eVOA attenuation versus time for the prior art eVOA apparatus when the eVOA attenuation is kept at the maximum level.
Figure 3:
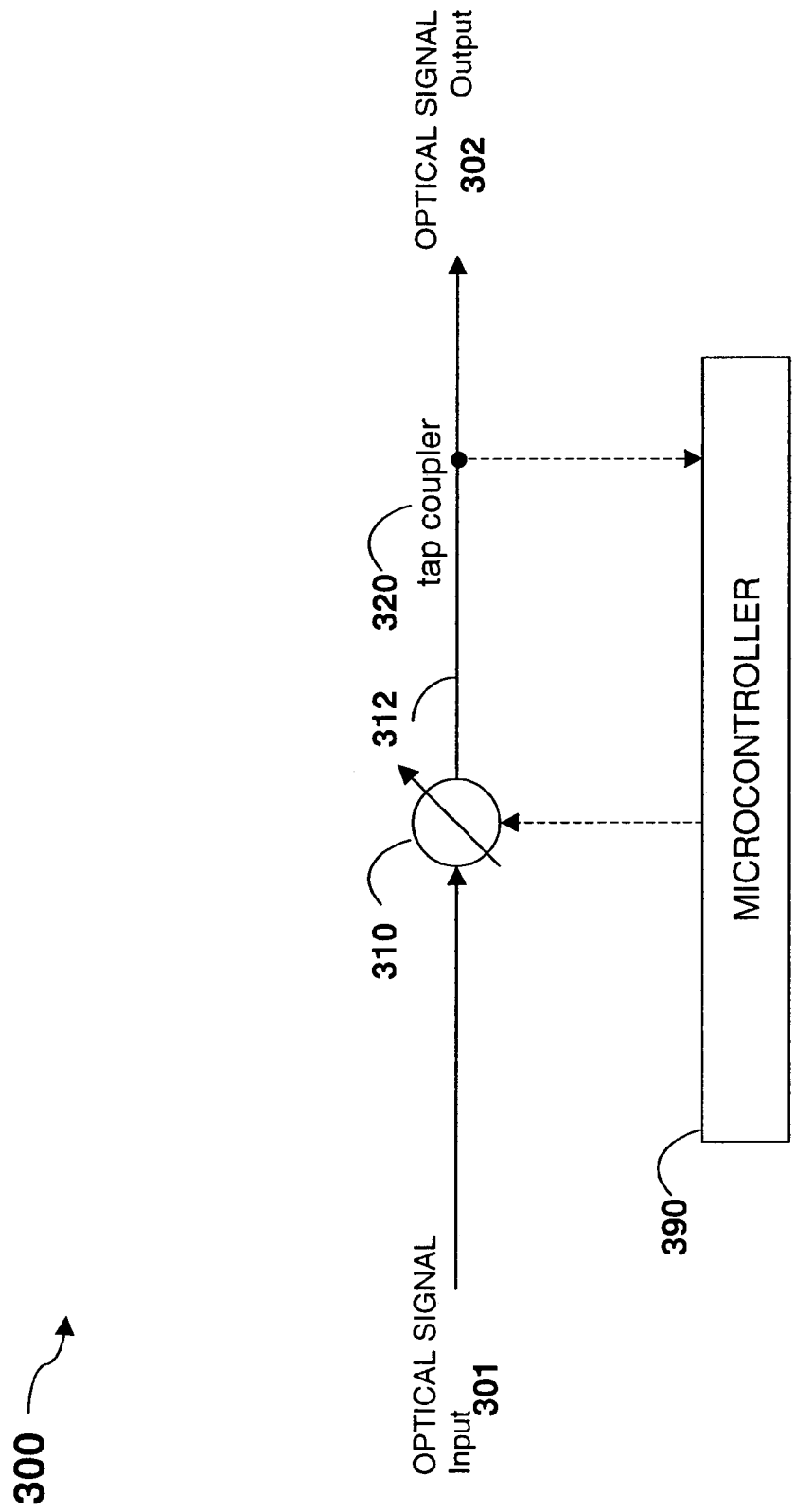
FIG. 3 illustrates an eVOA apparatus in accordance with a first embodiment of this invention.

FIG. 3 shows an eVOA apparatus 300 of the first embodiment for operating an electronically controlled variable optical attenuator (eVOA) connected to a microcontroller 390, the eVOA 310 is inserted in optical signal path of an optical channel in a wavelength division multiplexed (WDM) network. Referring to FIG. 3, an optical tap coupler 320 follows the eVOA 310 inserted in an incoming optical signal path 301, both the optical tap coupler 320 and the eVOA 310 are connected to a microcontroller 390 for monitoring and controlling the eVOA attenuation. The optical tap coupler 320 is used for detecting the power of the optical signal 302 at the output 312 of the eVOA 310. The optical tap coupler 320 is calibrated to accurately report the output signal power 302 at an output of the eVOA 310. This is done during the manufacturing process by placing an optical power-meter at the optical signal output and recording the photodetector response versus power over a range of powers. The output of the optical tap coupler 320 is processed by the microcontroller 390 to determine small and finite steps for controlling the eVOA 310 attenuation. The LOS power threshold is calibrated during commissioning of the installed optical control system to meet the requirements of the WDM network. The microcontroller 390 monitors and sets the attenuation of the eVOA 310.

The eVOA 310 is held at its maximum attenuation when the output measured power 302 is below the LOS power threshold. The microcontroller 390 continuously monitors for the presence of optical power (that is output measured power above the LOS power threshold). The eVOA 310 attenuation is also periodically decreased and then increased for a certain period of time to check for the presence of optical measured power at the output 312 of the eVOA 310. If no optical measured power is detected, the eVOA 310 attenuation is returned to the maximum attenuation. If, at any time, optical measured power is detected, normal control is restored (that is operating the eVOA 310 at the optical measured power).

Figure 4:
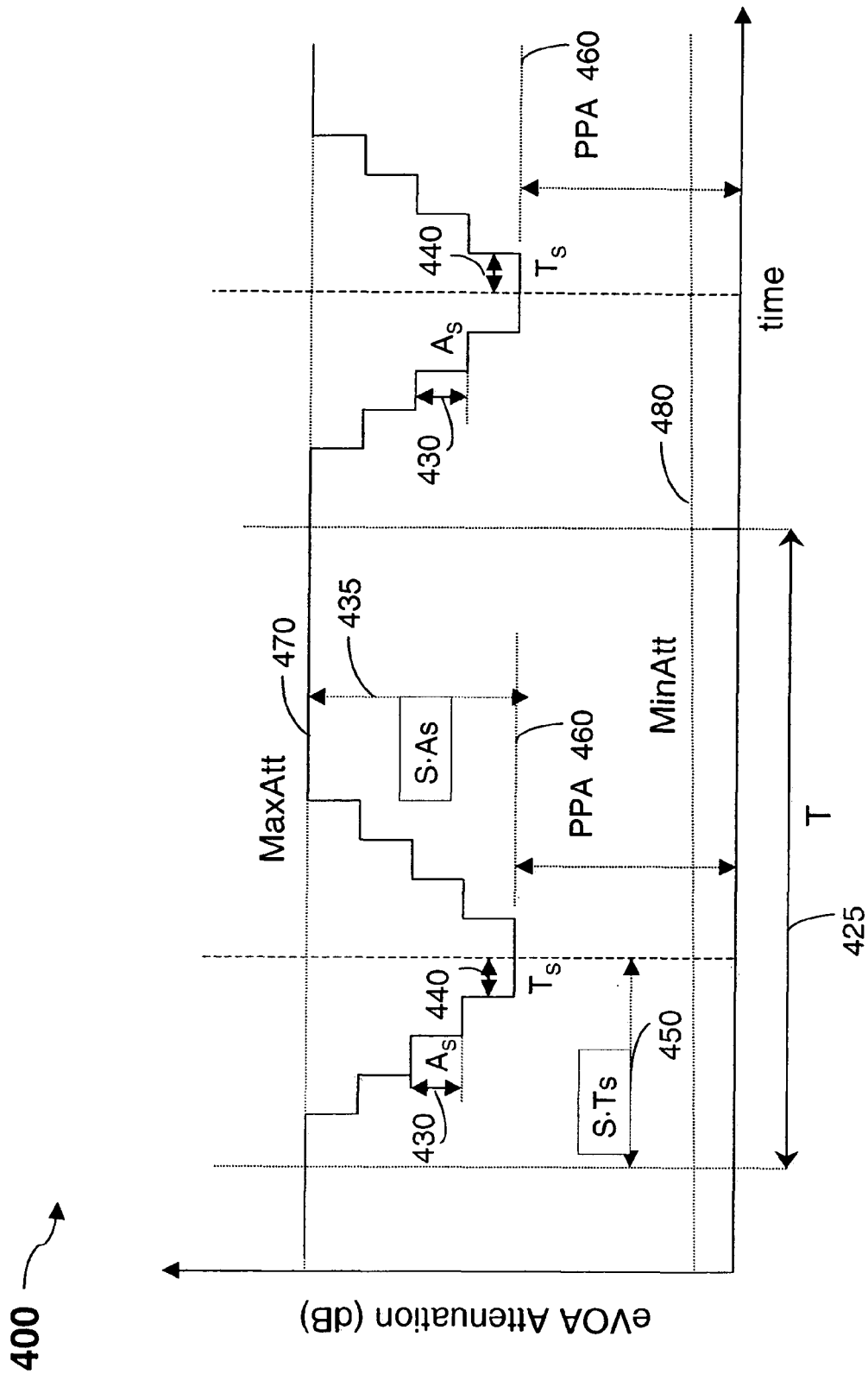
FIG. 4 is a diagram illustrating a stepping cycle of the eVOA 310 of the eVOA apparatus of FIG. 3.

FIG. 4 illustrates a stepping cycle (decreasing and increasing) 400 for the eVOA 310 attenuation in small and finite steps to sense for the presence of optical measured power. FIG. 4 shows a dependence of the eVOA 310 attenuation on which a minimum attenuation (MinAtt) 480 and a maximum attenuation (MaxAtt) 470 are shown. The microcontroller 390 of the apparatus of FIG. 3 is repeatedly decreasing or increasing the eVOA 310 attenuation (unless optical measured power is detected) within a time period T 425. The decrease and increase in eVOA 310 attenuation is done in a series of small and finite steps to some predefined value (which may be the predefined protection attenuation (PPA) 460 if desired). The number of steps "S", and attenuation per step, $A_s$ 430 can be chosen judiciously but the product $S \cdot A_s$ 435 must be less than the difference between the maximum attenuation (MaxAtt) 470 and the predefined protection attenuation (PPA) 460. Each step takes a finite time, $T_s$ 440 where $S \cdot T_s$ 450 is less than T 425. The value of $T_s$ 440 is minimized within the physical limitations of the optical control system and is limited by the response time of the microcontroller 390 and the slew rate of the eVOA 310 attenuation. Generally, $T_s$ 440 is on the order of the expected optical control system power transients (typically but not limited to around 1–10 ms).

Thus, the eVOA 310 is held at an attenuation that is not the maximum for a fraction of time, $(S \cdot T_s)$ and it is held at a maximum attenuation (MaxAtt) 470 for the remaining period of time, namely, $\{T-(S \cdot T_s)\}$. The value T 425 is kept reasonably small to maintain a reasonable fast response time of the microcontroller. As an illustration, for a value of time period, T=1 second, a number of steps S=4, and a time period per step $T_s$=10 ms, the eVOA apparatus 300 provides a decrease in power spikes risk of $\{1-(S \cdot T_s/T)=96\%\}$ compared to prior art. The step size, $A_s$ 430 is chosen to provide an acceptable power transient to downstream components. For example, a value of relative power ratio of 0.5 (representing a decrease in attenuation of 50%) or −3 dB on a log scale provides an acceptable power transient, while, for example, −20 dB may be excessive in certain situations.

While the optical power risk may be characterized as a function of both the optical power of a transient and the length of time during which that transient is present, it can be seen that the optical power applied prior to the initiation of the stepping cycle would introduce only a low-powered transient (contained by the step value $A_s$ 430), while optical power applied during the stepping cycle may possibly introduce a higher-powered transient, but only for a limited time period (contained by the stepping time interval $T_s$ 440).

The number of steps "S" is chosen such that the product $S \cdot A_s$ 435 allows the microcontroller 390 to detect sufficiently small optical powers, as dictated by the optical control system requirements. The number of steps "S" is equal to a maximum number of steps "$S_1$" for decreasing the attenuation or a maximum number of steps "$S_2$" for increasing the attenuation, wherein $S_1 \neq S_2$.

Figure 5:
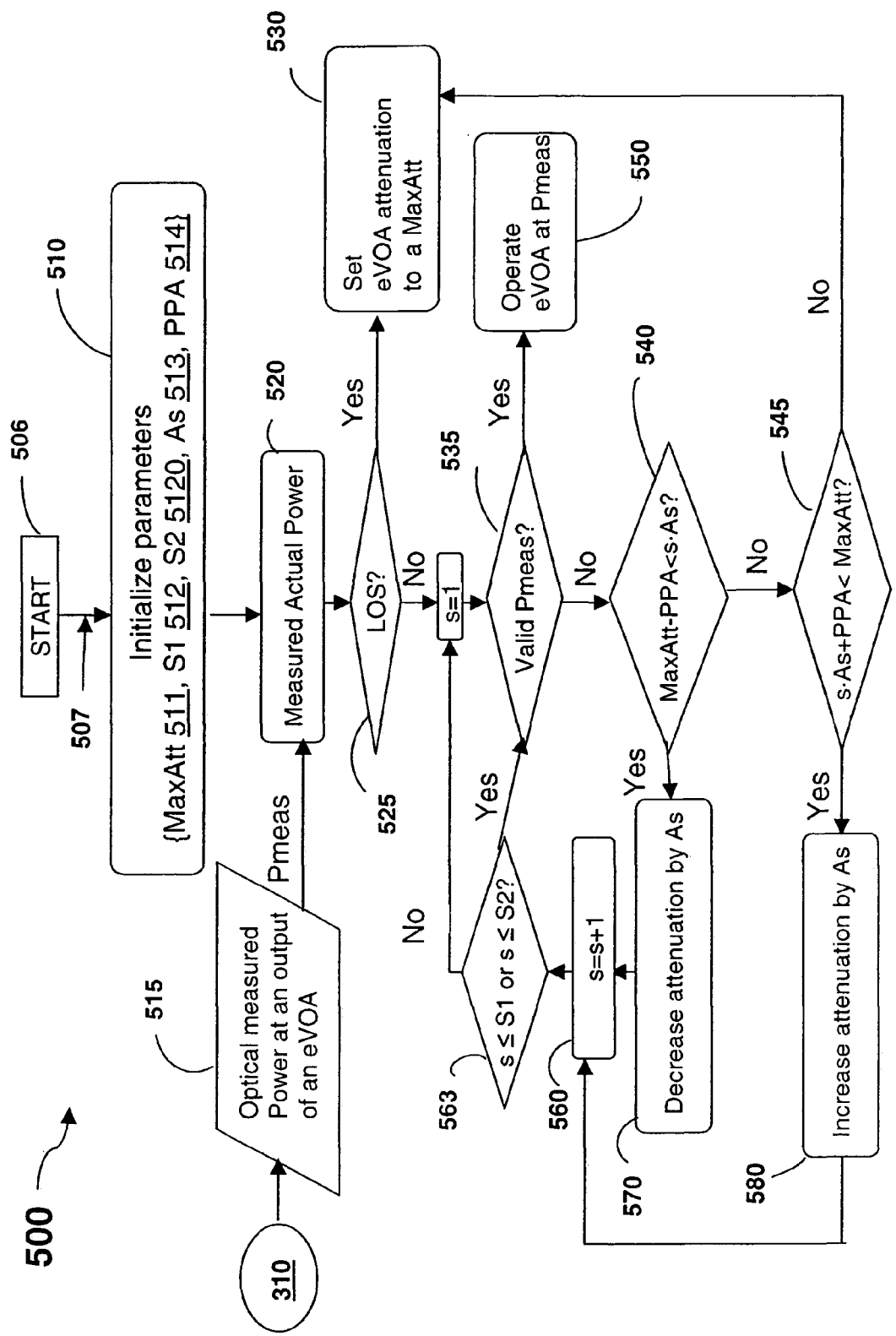
FIG. 5 is a flow chart diagram illustrating a method of operating the eVOA apparatus of FIG. 3.

FIG. 5 is a flow chart diagram 500 illustrating a method for operating the eVOA apparatus 300 of FIG. 3. The normal operating attenuation of an eVOA 310 is monitored and stored by the microcontroller 390. The method 500 is incorporated on the microcontroller 390 for controlling the eVOA 310 attenuation, wherein upon start up (block 506); routine 507 initializes the eVOA 310 control circuit parameters (block 510). The parameters comprise an eVOA maximum attenuation (MaxAtt) 511, a number of steps for decreasing the eVOA attenuation $S_1$ 512, a number of steps for increasing the eVOA attenuation $S_2$ 5120, an attenuation value per step $A_s$ 513, and a pre-defined value for protection attenuation (PPA) 514. Routine 507 uses actual measured power {Pmeas} (block 520) at an output of an eVOA (block 515). If a loss-of-signal (LOS) condition is detected (block 525), routine 507 sets the eVOA 310 attenuation to a maximum attenuation (MaxAtt 511) (block 530). If a valid measured power is detected (block 535), routine 507 operates the eVOA 310 at the valid measured power (block 550), (that is normal control is restored); if a valid measured power is detected below a LOS power threshold (block 535), routine 507 decreases the eVOA 310 attenuation (block 570) by $A_s$ 513, increases the number of steps by one (block 560), and checks for a valid measured power above the LOS power threshold (block 535). If the valid measured power is detected to be below the LOS power threshold and the maximum defined number of steps $S_1$ 512 is reached (block 563), and if {MaxAtt−PPA≧$S_1 \cdot A_s$} (block 540), routine 507 increases the eVOA attenuation (block 580) by $A_s$ 513, and checks again for a valid measured power above the LOS power threshold (block 535). If a valid measured power is detected below the LOS power threshold (block 535) and the maximum defined number of steps $S_2$ 5120 is reached (block 563), and if {$S_2 \cdot A_s$+PPA≧MaxAtt} (block 545), routine 507 resets the eVOA 310 attenuation to the maximum attenuation (MaxAtt 511) (block 530). Periodically, the attenuation is reduced or increased in steps for short intervals to minimize the risk of a high-power transient being introduced to downstream components.

Figure 6:
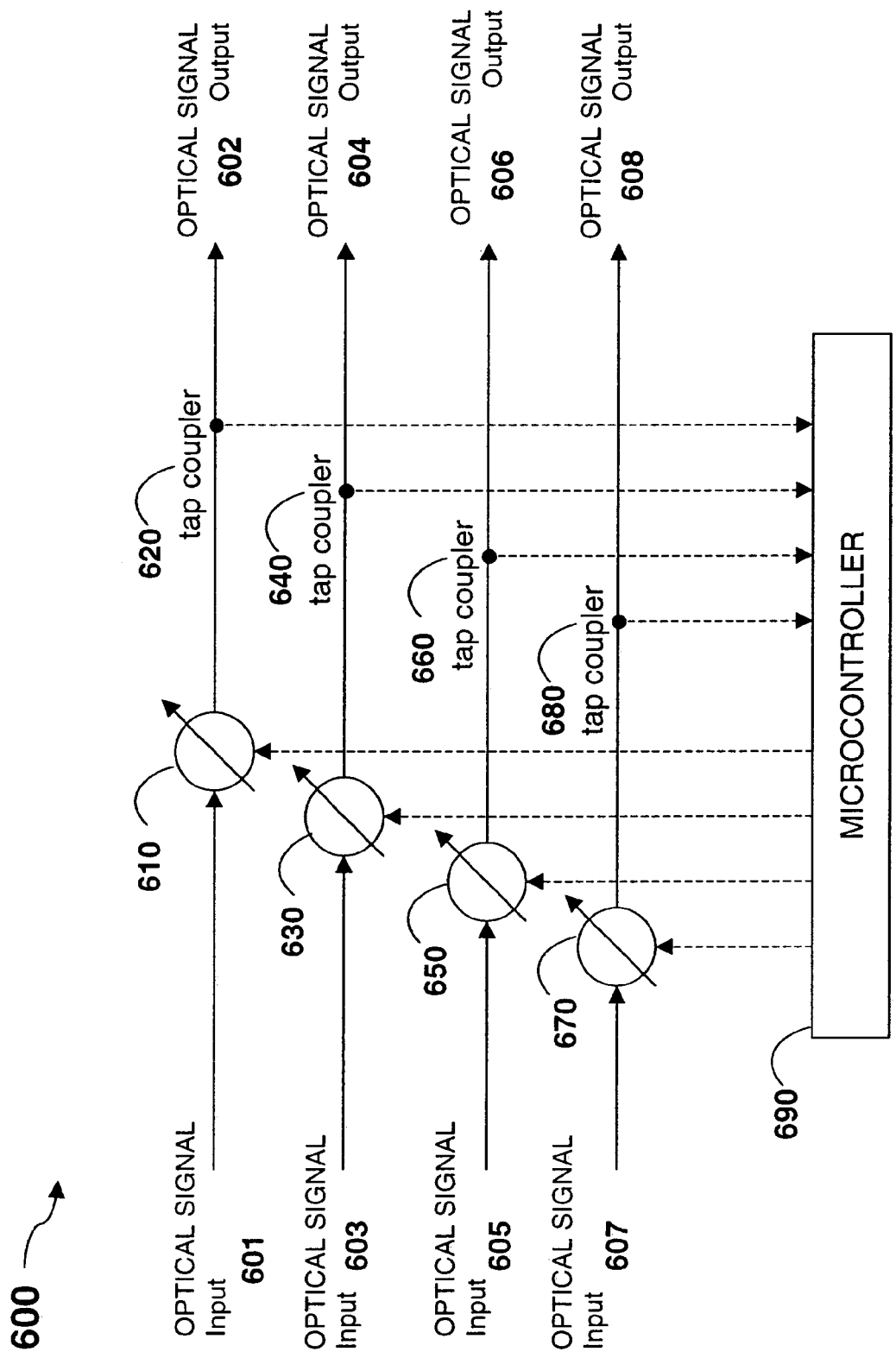
FIG. 6 illustrates multiple eVOA apparatus in accordance with a second embodiment of this invention.

FIG. 6 shows a multiple eVOA apparatus 600 of the second embodiment for operating a plurality of eVOAs connected to a microcontroller 690, wherein the plurality of eVOAs 610, 630, 650 and 670 follow by a plurality of optical tap couplers 620, 640, 660 and 680 respectively connected to the microcontroller 690. The plurality of eVOAs may include "n" eVOAs, wherein n>1. In FIG. 6, the optical tap couplers 620, 640, 660 and 680 follow a plurality of eVOAs 610, 630, 650 and 670 inserted in the path of incoming optical signals 601, 603, 605 and 607 respectively. The optical tap couplers 620, 640, 660 and 680 are used for detecting the power of the respective optical signals 602, 604, 606 and 608 at the outputs of the eVOAs 610, 630, 650, and 670 correspondingly. The optical tap couplers 620, 640, 660 and 680 are calibrated to accurately report the respective output signals powers 602, 604, 606 and 608. As described above, this is done during the manufacturing process by placing an optical power-meter at the optical signal output of each eVOA and recording the photodetector response versus power over a range of powers. The LOS power threshold is calibrated during commissioning of the installed optical system to meet the requirements of the optical network. The outputs of the optical tap couplers 602, 604, 606 and 608 are processed by a microcontroller 690 to determine small and finite steps for controlling the attenuations of the eVOAs 610, 630, 650 and 670. The microcontroller 690 monitors and sets the attenuation of the eVOAs 610, 630, 650 and 670.

Figure 7:
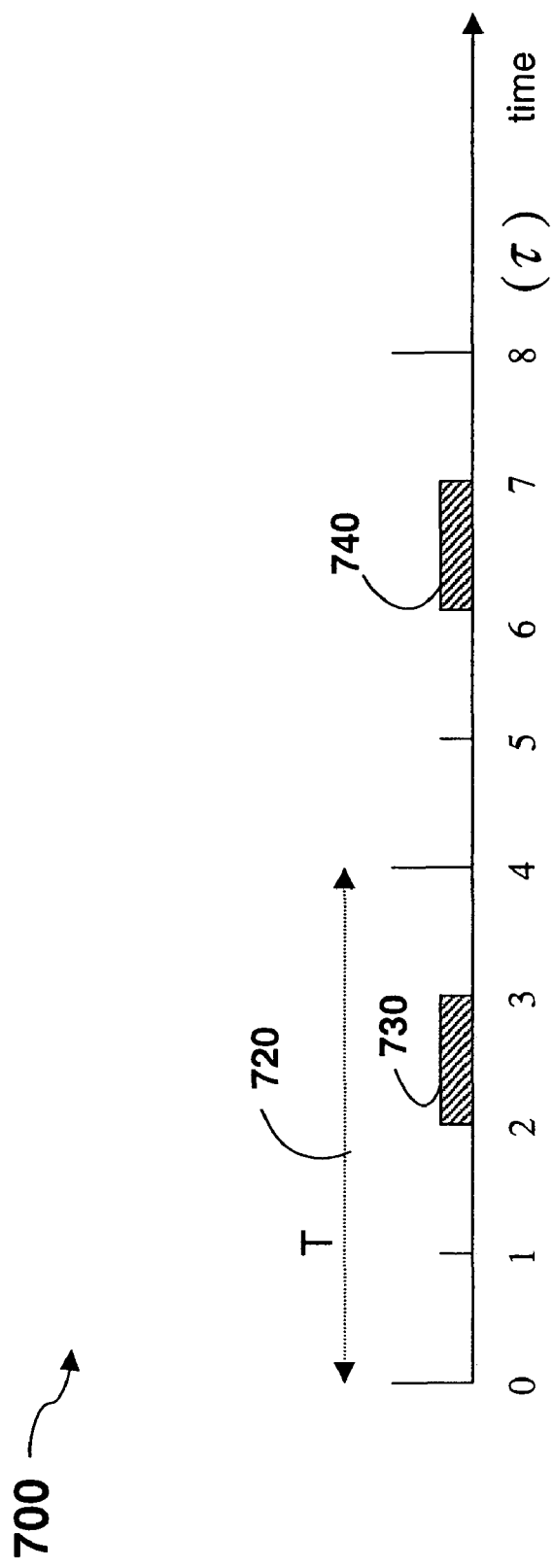
FIG. 7 is a diagram illustrating a microcontroller cycling time slots for the multiple eVOAs apparatus in FIG. 6.

FIG. 7 shows a diagram 700 illustrating a microcontroller time division multiplexing for the "n" eVOAs, wherein the number of eVOAs "n" is equal to four, as shown in FIG. 6. The microcontroller 690 actively monitors and controls one eVOA circuit at-a-time. The microcontroller 690 time divisions multiplexes its control amongst the eVOAs 610, 630, 650 and 670 circuits it services, wherein the order of the eVOAs 610, 630, 650 and 670 can be arbitrary or in certain sequence, as required. The microcontroller 690 continuously cycles its control through each circuit within a time period, T 720, wherein T 720 is a sum of all time periods $\{t_i$ and i=1, ..., n$\}$, "n" is the number of eVOAs, and n>1, and $t_i$ is the time for actively controlling each eVOA. In case wherein each of the "n" eVOAs circuits is being actively controlled for a time, τ 730 and 740, the value "n·τ"<=T 720, and $t_1=t_2=t_i=t_n=\tau$, τ=T/n, and τ is the time for actively controlling each eVOA. For stepping up, the microcontroller's 690 cycling of the plurality of eVOAs 610, 630, 650 and 670 takes a finite time "$T_s$" for each step, and $$\tau = S_1 \cdot T_s < \frac{T}{n},$$

wherein "$T_s$" being the expected optical control system power transient time, and $S_1$ is the maximum number of steps for decreasing each eVOA attenuation. For stepping down, the microcontroller's 690 cycling of the plurality of eVOAs 610, 630, 650 and 670 takes a finite time "$T_s$" for each step, and $$\tau = S_2 \cdot T_s < \frac{T}{n},$$

wherein "$T_s$" being the expected optical control system power transient time, and $S_2$ is the maximum number of steps for increasing the eVOA attenuation.

Figure 8:
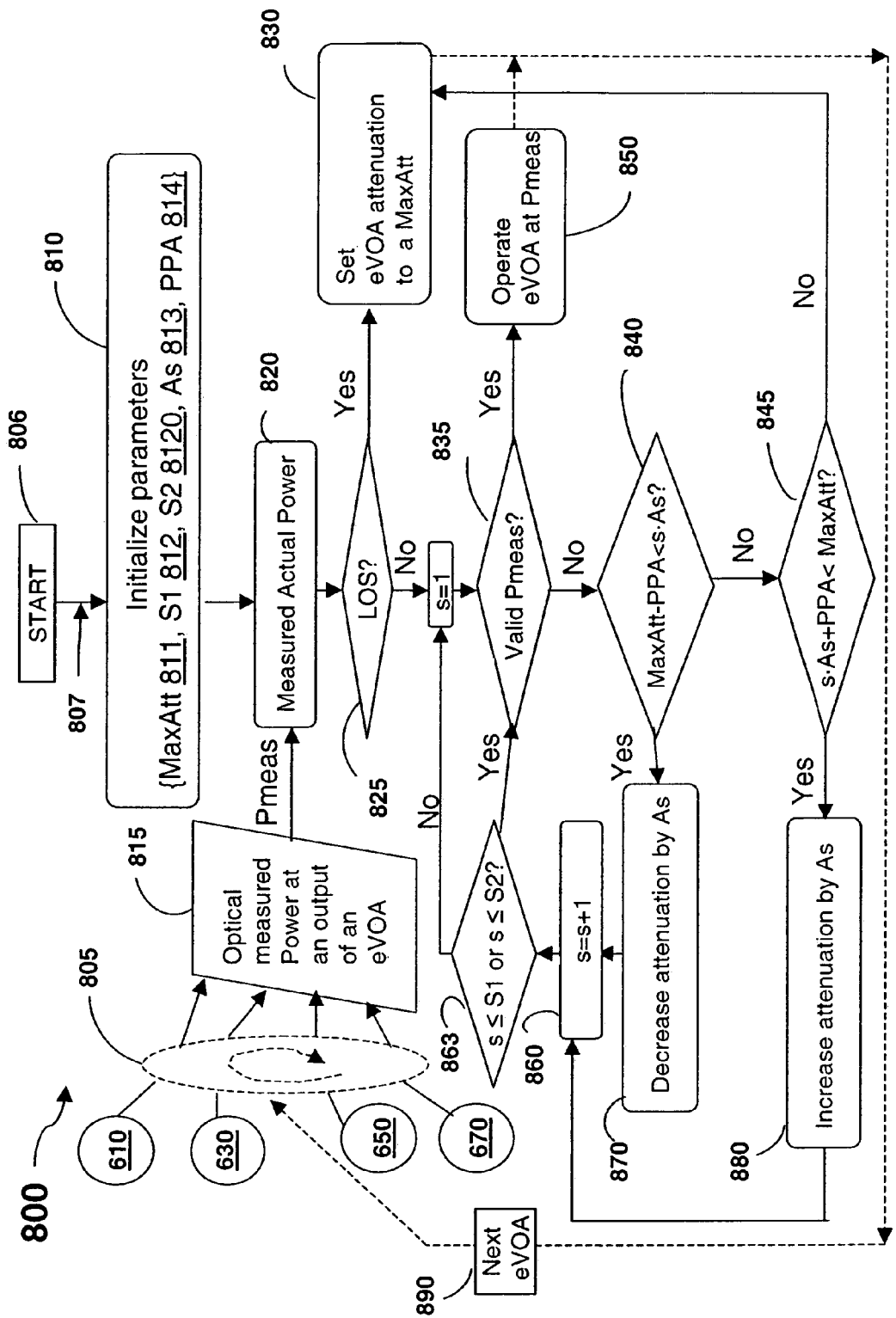
FIG. 8 is a flow chart diagram illustrating a method of operating the multiple eVOAs apparatus of FIG. 6.

FIG. 8 is a flow chart diagram 800 illustrating a method for operating the multiple eVOAs apparatus 600 of FIG. 6, wherein upon start up (block 806), routine 807 initializes the parameters (block 810) for each eVOA. The parameters comprise an eVOA maximum attenuation (MaxAtt) 811, a maximum number of steps for decreasing the eVOA attenuation $S_1$ 812, a maximum number of steps for increasing the eVOA attenuation $S_2$ 8120, an attenuation value per step $A_s$ 813, and a pre-defined value for the protection attenuation (PPA) 814. Routine 807 uses actual measured power {Pmeas} (block 820) at an output of an eVOA (block 815). When a LOS power condition (block 825) is detected on a given channel at an output of an eVOA, routine 807 sets said eVOA attenuation to a maximum attenuation (MaxAtt 811) (block 830). If a valid measured power is detected (block 835), routine 807 operates the eVOA at the valid measured power (block 850), (that is normal control is restored); if a valid measured power is detected below a LOS power threshold (block 835), routine 807 decreases the eVOA attenuation (block 870) by $A_s$ 813, increases the number of steps by one (block 860), and checks for a valid measured power above the LOS power threshold (block 835). If the valid measured power is detected to be below the LOS power threshold and the maximum defined number of steps $S_1$ 812 is reached (block 863), and if {MaxAtt−PPA≧$S_1 \cdot A_s$} (block 840), routine 807 increases the eVOA attenuation (block 880) by $A_s$ 813, and checks again for a valid measured power above the LOS power threshold (block 835). If a valid measured power is detected below the LOS power threshold (block 835) and the maximum defined number of steps $S_2$ 8120 is reached (block 863), and if $\{S_2 \cdot A_s + PPA \geq MaxAtt\}$ (block 845), routine 807 resets the eVOA attenuation to the maximum attenuation (MaxAtt 811) (block 830). The microcontroller 690 cycles through each channel, monitoring and adjusting each eVOA as required. When the microcontroller 690 returns its attention to the channel with a LOS condition, it checks for a valid optical measured power above a LOS power threshold (block 835). If the optical measured power is below the LOS power threshold, it decreases (block 870) or increases (block 880) the attenuation by a predetermined step, and checks again for a valid optical measured power above the LOS power threshold (block 835). If the optical measured power is below the LOS power threshold, it again decreases (block 870) or increases (block 880) the attenuation by a predetermined step and checks for a valid optical measured power above the LOS power threshold (Block 835). This procedure continues for a number of steps, $S_1$ 812 and $S_2$ 8120 (or until a valid optical measured power above the LOS power threshold is observed). If a valid optical measured power below the LOS power threshold is observed (block 835), the eVOA attenuation is set to the maximum attenuation (MaxAtt 811) (block 830) and the microcontroller 690 then proceeds (block 890 next eVOA) to the next channel (Block 805).

The flow chart 800 repeats the same procedure for all eVOAs, selecting one eVOA out of eVOAs 610, 630, 650 and 670 at a time for processing (via dotted line loop including box 890).

Figure 9:
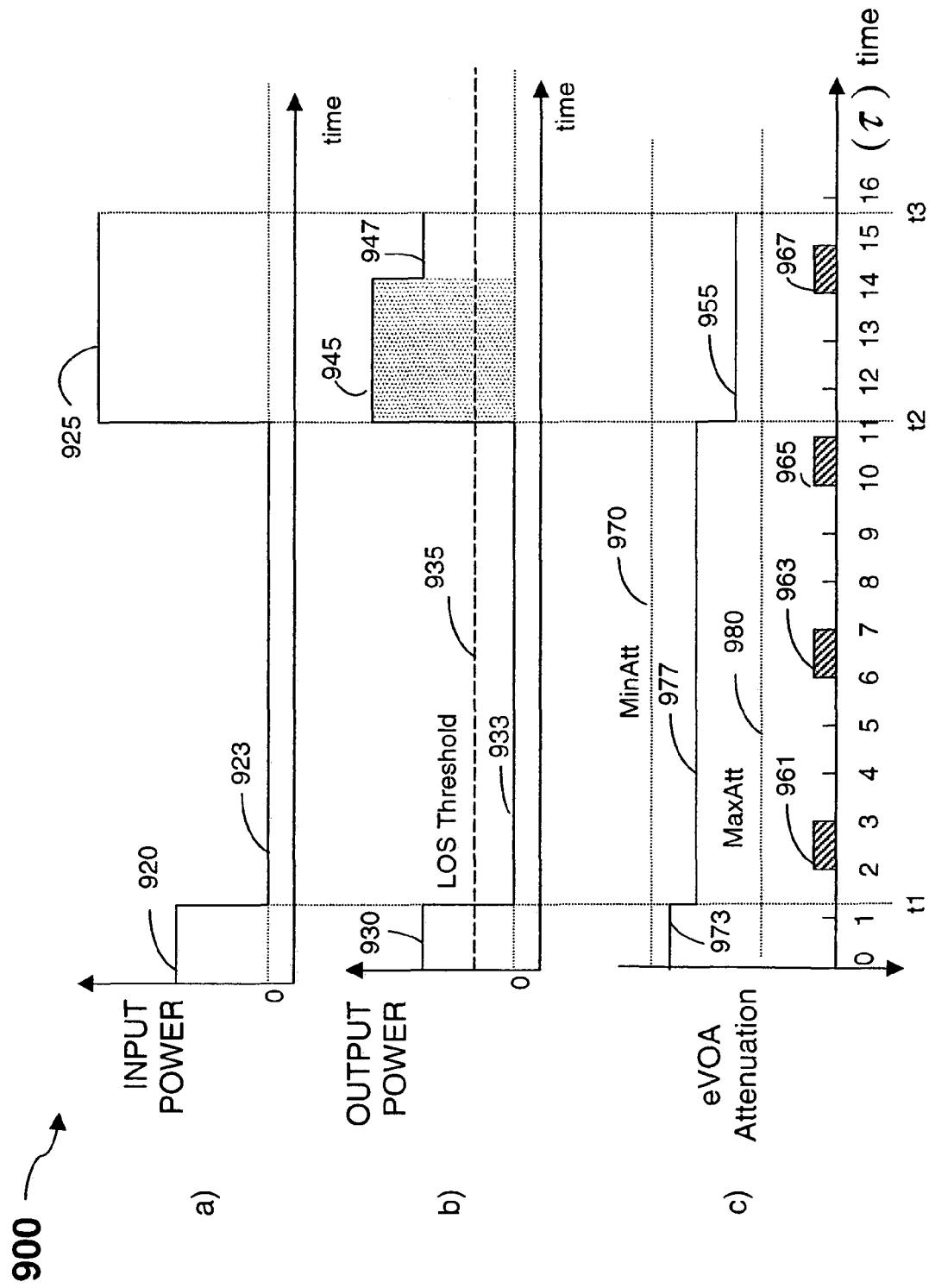
FIG. 9 is a diagram illustrating a dependence of input power, output power and eVOA attenuation versus time for the multiple eVOA apparatus of FIG. 6 when each eVOA is operating according to the prior art methods.

FIG. 9 shows a diagram 900 illustrating the optical control system behaviour for a microcontroller 690 monitoring a multiplicity of eVOAs when each eVOA is controlled according to the prior art methods. Referring to FIG. 9, graphs (a), (b), and (c) are for an input power versus time, an output power versus time and the eVOA attenuation versus time, respectively. In graph (a), at time t1, the input power 920 is removed and then reapplied after a specified time period t2, where the input optical power 925 is much higher. Between times t1 and t2 the input power 923 is zero. In graph (c), before time t1, the eVOA attenuation is set at the non-maximum attenuation 973. When the input power 920 in graph (a) is removed (that is at time t1), each eVOA control circuit maintains its eVOA attenuation at non-maximum attenuation 977 between times t1 and t2 and 955 between times t2 and t3. The eVOA minimum attenuation (MinAtt) 970 and maximum attenuation (MaxAtt) 980 are shown in graph (c). Graph (c) also shows the specified time periods, 961, 963, 965 and 967 for actively monitoring and controlling one eVOA circuit at-a-time. The microcontroller 690 continuously cycles its control through each circuit within said specified time period. Referring now to graph (b), before time t1, the output power 930 is a valid optical signal power (that is output signal power above the LOS power threshold). Between times t1 and t2, the output power 933 is dropped below the LOS power threshold 935. Then, at time t2, when the input power 920 in graph (a) is reapplied, the output power spike 945 surges significantly above the previous output power 930, as shown in graph (b). This output power spike 945 in graph (b) lasts until the microcontroller detects the presence of optical power and attenuates the eVOA so as to reach the steady state output power 947. In this case, the duration of the optical power spike is increased by a significant amount and the maximum time is approximately $(n-1) \cdot \tau$, wherein $\tau$ is the specified time period 961, 963, 965 and 967, and "n" is the number of eVOAs, where "n" is equal four in this example.

Figure 10:
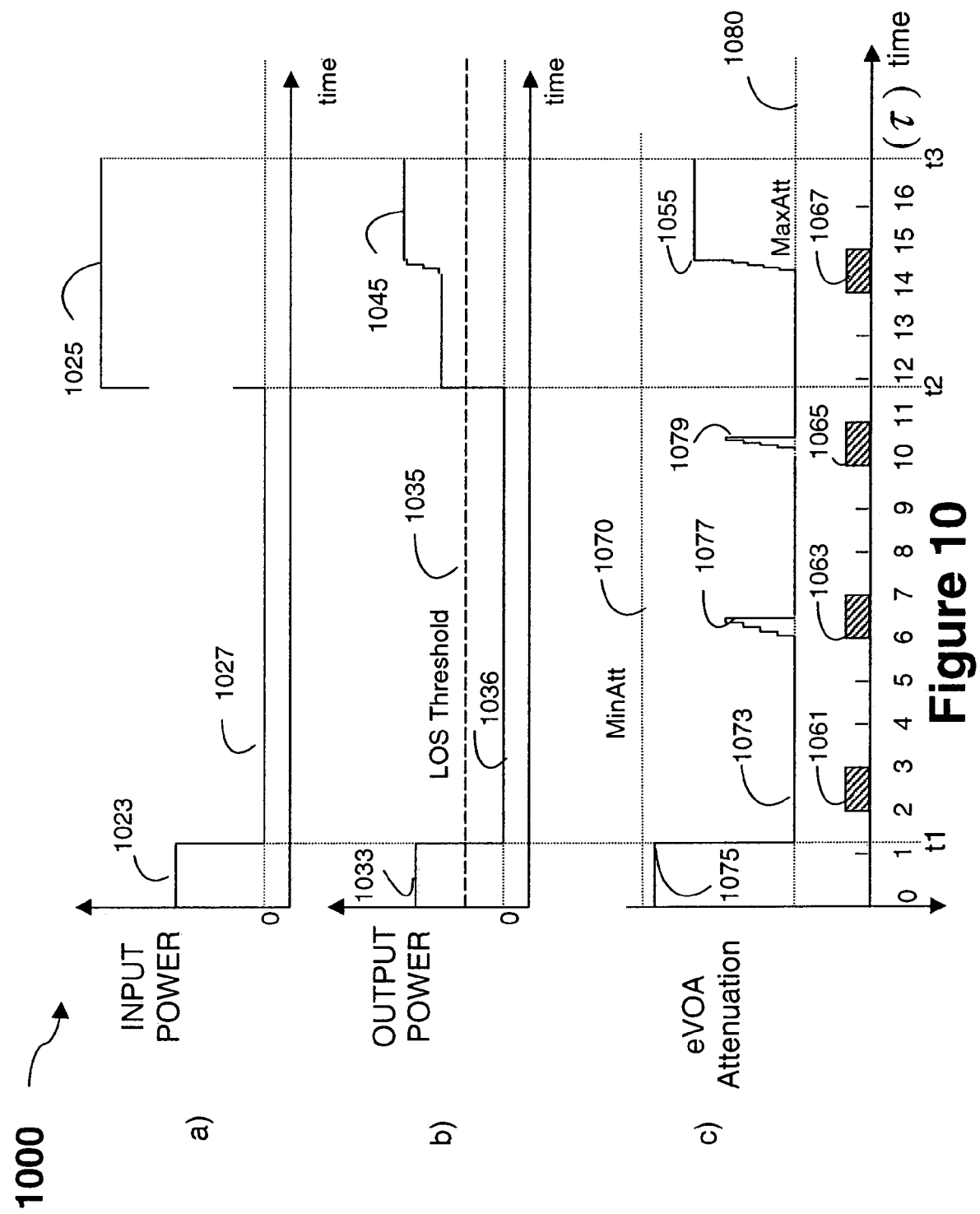
FIG. 10 is another diagram illustrating a dependence of input power, output power, and eVOA attenuation versus time for the multiple eVOAs apparatus of FIG. 6, while operating according to the method of FIG. 8.

FIG. 10 shows a diagram 1000 illustrating the optical control system behaviour for a microcontroller 690 incorporating the method of FIG. 8 described above. Referring to FIG. 10, graphs (a), (b), and (c) are for an input power versus time, an output power versus time, and the eVOA attenuation versus time, respectively. In graph (a), at time t1, the input power 1023 is removed and then reapplied after a specified time period t2, where the input optical power 1025 is much higher. Between times t1 and t2 the input power 1027 is zero. In graph (c), before time t1, the eVOA attenuation is set at the non-maximum attenuation 1075. When the input power 1023 in graph (a) is removed (that is at time t1), the eVOA control circuit maintains its eVOA attenuation 1073 at its maximum attenuation 1080. The eVOA minimum attenuation (MinAtt) 1070 and maximum attenuation (MaxAtt) 1080 are shown in graph (c). The microcontroller 690 cycles the eVOAs 610, 630, 650 and 670 circuits, decreases or increases the eVOA attenuation in steps 1077 and 1079, and controls each eVOA for a time period 1061, 1063, 1065 and 1067 as shown in graph (c). Referring now to graph (b), before time t1, the output power 1033 is a valid optical signal power (that is output signal power above the LOS power threshold). Between times t1 and t2, the output power 1036 is below the LOS power threshold 1035 and between times t2 and t3, the output power 1045 is above the LOS power threshold 1035 and has no spikes. In this case, the eVOA attenuation 1055 in graph (c) eliminates the power spike in the output power 1045 in graph (b). Accordingly, the method of this invention eliminates the power spike in the output power 1045 as shown in graph (b).

Thus, the embodiments of the invention provide a method and apparatus for operating an eVOA by modulating its attenuation, wherein the attenuation periodically and quickly decreased and/or increased in steps while checking for the presence of optical signals above the LOS power threshold.

The embodiments also provide a method of operating a multiplicity of eVOAs, while minimizing the risk of damage to optical network equipment.

It will be apparent to those with skill in the art that modifications to the above methods and embodiments can occur without deviating from the scope of the present invention. Accordingly, the disclosures and descriptions herein are intended to be illustrative, but not limiting, of the scope of the invention which is set forth in the following claims.

What is claimed is:

1. A method for operating an electronically controlled variable optical attenuator (eVOA) inserted in an optical path of an optical signal, the method comprising the steps of:
    monitoring an optical signal power at an output of the eVOA;
    setting the attenuation of the eVOA to a substantially maximum attenuation (MaxAtt); and
    modulating the attenuation of the eVOA, by decreasing and increasing the eVOA attenuation in steps until the optical signal power is detected above the LOS power threshold, or the maximum attenuation (MaxAtt) is reached.

2. A method as described in claim 1, wherein the step of monitoring comprises a step of operating the eVOA so as to maintain said optical signal power if the measured optical signal power is above the LOS power threshold.

3. A method as described in claim 1, wherein the step of monitoring the eVOA attenuation comprises a step of storing said eVOA attenuation.

4. A method as described in claim 1, wherein the step of modulating the eVOA attenuation by decreasing and increasing the attenuation in steps comprises a step of determining a maximum number of steps "$S_1$" for decreasing the attenuation, a maximum number of steps "$S_2$" for increasing the attenuation, an attenuation value per step "$A_s$", and a predefined protection attenuation (PPA).

5. A method as described in claim 4, wherein the step of modulating the eVOA attenuation in steps comprises decreasing the attenuation in steps, which size is $A_s$, wherein $\{MaxAtt - PPA\} \leq S_1 \cdot A_s$.

6. A method as described in claim 4, wherein the step of modulating the eVOA attenuation in steps comprises increasing the attenuation in steps, which size is $A_s$, wherein $\{S_2 \cdot A_s + PPA\} \leq MaxAtt$.

7. A method as described in claim 4, wherein the step of decreasing and increasing the eVOA attenuation in steps comprises a step of checking for a valid optical measured power at the output of said eVOA, the valid optical measured power being a signal measured power above the LOS power threshold.

8. An apparatus for operating an electronically controlled variable optical attenuator (eVOA) inserted in an optical path of an optical signal, comprising:
 a microcontroller for monitoring an optical signal power at an output of the eVOA;
 setting the attenuation of the eVOA to a substantially maximum attenuation (MaxAtt); and
 modulating the attenuation of the eVOA by decreasing and increasing of the eVOA attenuation in steps until the optical signal power is detected above the LOS threshold, or the maximum attenuation (MaxAtt) is reached.

9. A method of operating a plurality of eVOAs inserted in optical paths of optical signals propagating in an optical network, comprising the steps of:
 (a) selecting an eVOA from the plurality of eVOAs;
 (b) operating the selected eVOA according to the method of claim 1 within a time period allocated for the selected eVOA;
 (c) repeating the steps (a) to (b) until all eVOAs from the plurality of eVOAs have been selected; and
 (d) repeating the steps (a) to (c) as required.

10. A method as described in claim 9, wherein the step of selecting the eVOA from the plurality of eVOAs comprises a step of continuously cycling said eVOAs in a specified time period "T", wherein "T" is a sum of all time periods $\{t_i$ and $i+1, \ldots, n\}$, "n" is the number of eVOAs, $n > 1$, and $t_i$ is the time for actively controlling each eVOA.

11. A method as described in claim 10, wherein the step of cycling comprises choosing $t_1 = t_2 = t_i = t_n = \tau$, $\tau = T/n$, and $\tau$ is the time for actively controlling each eVOA.

12. A method as described in claim 9, wherein the cycling through the plurality of eVOAs comprises taking a finite time "$T_s$" for each attenuation step, and $$\tau = S_1 \cdot T_s < \frac{T}{n},$$

wherein "$T_s$" being the expected optical control system power transient time, and $S_1$ is the maximum number of steps for decreasing the eVOA attenuation.

13. A method as described in claim 9, wherein cycling through the plurality of eVOAs comprises taking a finite time "$T_s$" for each attenuation step, and $$\tau = S_2 \cdot T_s < \frac{T}{n},$$

wherein "$T_s$" being the expected optical control system power transient time, and $S_2$ is the maximum number of steps for increasing the eVOA attenuation.

14. An apparatus for operating a plurality of eVOAs inserted in optical paths of optical signals, the apparatus comprising a microcontroller having:
 (a) a means for selecting an eVOA from the plurality of eVOAs; and
 (b) a means for operating the selected eVOA according to the method of claim 1 within a time period allocated for the selected eVOA.

* * * * *

UNITED STATES PATENT AND TRADEMARK OFFICE
CERTIFICATE OF CORRECTION

PATENT NO. : 7,072,561 B2
APPLICATION NO. : 10/618604
DATED : July 4, 2006
INVENTOR(S) : G. B. Scarth et al.

It is certified that error appears in the above-identified patent and that said Letters Patent is hereby corrected as shown below:

Column 11, line 11, "$\{\text{MaxAtt} - \text{PPA}\} \leq S_1 \cdot A_s$." is corrected to read as --$\{\text{MaxAtt} - \text{PPA}\} \leq S_1 \cdot A_s$.--.

Column 11, line 15, "$\{\text{MaxAtt} - \text{PPA}\} \leq S_1 \cdot A_s$." is corrected to read as --$\{\text{MaxAtt} - \text{PPA}\} \leq S_1 \cdot A_s$.--.

Column 12, line 5, "$\{t_i \text{ and } i+1, \ldots, n\}$" is corrected to read as --$\{t_i \text{ and } i=1, \ldots, n\}$--.

Signed and Sealed this

Fifth Day of August, 2008

JON W. DUDAS
*Director of the United States Patent and Trademark Office*